March 12, 1929. W. ELLIOTT 1,705,358
DRAFT DEVICE FOR IMPLEMENTS
Filed Nov. 13, 1925  2 Sheets-Sheet 2

Inventor
William Elliott
By
Hubert Beck  Attorney

Patented Mar. 12, 1929.

1,705,358

UNITED STATES PATENT OFFICE.

WILLIAM ELLIOTT, OF BEATRICE, NEBRASKA, ASSIGNOR TO DEMPSTER MILL MANUFACTURING COMPANY, OF BEATRICE, NEBRASKA, A CORPORATION OF NEBRASKA.

DRAFT DEVICE FOR IMPLEMENTS.

Application filed November 13, 1925. Serial No. 68,834.

This invention relates to draft devices for agricultural implements, and is based on an example showing a four horse draft device or so-called evener for a two row cultivator or other implement, say of the type illustrated by my Patent No. 1,279,677, dated Sept. 24, 1918; and the objects and nature of the invention will be readily understood by those skilled in the art in the light of the following explanations of the accompanying drawings that illustrate what I now believe to be the preferred mechanical expression or embodiment of my invention from among other constructions and arrangements within the spirit and scope thereof.

The ordinary center pivoted evener bar for a two straddle row cultivator, such for example as illustrated by my above mentioned patent, embodies a single stiff evener bar; and where a four horse team is to be hitched to this bar, the single bar must be longer than the over-all width of the cultivator (the distance between the two cultivator wheels) because the four horse team and the two row cultivator in working a field will occupy five spaces and straddle four rows. This requires an evener bar that is so long as to be inconvenient for storage purposes, and is too long to permit passage thereof with the team and cultivator attached, through the ordinary farm gates, barn door openings, machine shed openings, or the ordinary narrow bridges that are of sufficient width for passage of the cultivator without the over long evener.

An object of the present invention is to provide means that will overcome the hereinbefore mentioned difficulty, by the production of a center pivoted draft mechanism or evener device of greater normal over-all length than the distance between the outer end ground wheels of the implement, that embodies end portions to which the draft attachments are hitched, capable of being folded by hand or otherwise to reduce the over-all length of the evener for cultivator storage and display purposes, and that are also capable of swinging forwardly when released, under the pull of the draft animals, to thereby reduce the over-all length of the evener device under such abnormal conditions as the necessity of pulling the implement through a passage of sufficient width to permit passage of the implement but too narrow for passage of the evener device when in the normal operative form and adjustment required for field work.

With this and other objects in view, the invention consists of certain novel features of construction and of combinations and arrangements as more fully and particularly set forth and specified hereinafter.

Referring to the accompanying drawings.

Figure 1:
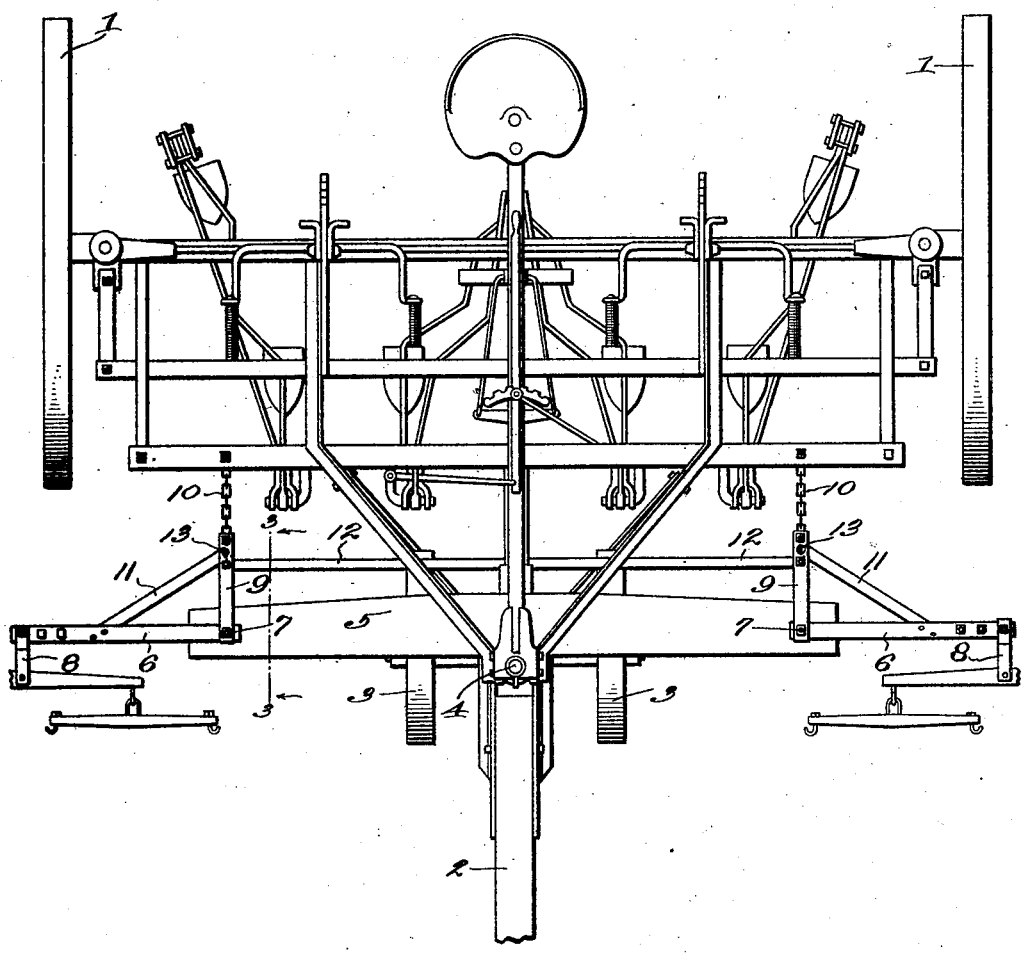
Fig. 1 is a top plan of an implement equipped with an evener device in accordance with my present invention.

In the drawings, I show a two row cultivator, say the cultivator of my hereinbefore mentioned patent. This cultivator is provided with the end ground wheels 1, that define the extreme over all width of the implement itself. This cultivator is provided with forwardly extending tongue 2, and with a caster wheel front center truck 3, that embodies a front vertical spindle 4, on which the evener device is centered and swingable horizontally.

The evener bar unit of the evener mechanism, embodies three sections, namely; a strong straight longitudinally elongated center member, such as wooden bar or beam 5, and two longitudinal end extensions 6, of said center member. The center member or bar 5, corresponds to the common evener bar much reduced in length.

The member 5, is carried by the caster wheel truck and is swingable horizontally on the truck spindle 4 as a center located midway the length of said member.

The member 5 is shorter than the overall width of the cultivator and hence will not interfere with the movement of the cultivator through any passageway of sufficient width for the passage thereof. However, the member 5 is too short to permit hitching thereto the draft devices necessary for a multi-animal team, such as a four animal team arranged to travel as hereinbefore described.

The normal operative required evener bar length for such a team is provided for by the two preferably similar straight longitudinal end extensions 6.

Each end extension 6, in this example, consists of a pair of strong longitudinal steel bars, at their inner ends overlapping the end portion of the center member and arranged above and below the same and normally tightly clamped thereto by a strong vertical bolt 7, passing down through the two steel bars and the member 5. The two usually similar steel bars of an extension 6, are preferably arranged one over the other and vertically spread apart to straddle the member 5, and riveted or otherwise fixed together at their outer ends, and the outer end of each end extension 6, is provided with any suitable means, such as clevis 8, for the attachment of the draft devices for several, say two, draft animals arranged to travel side by side and in the spaces between different rows of plants.

The strong stiff evener bar sections 6, are normally fixed to the evener bar section 5, to form and constitute rigid longitudinal end extensions or continuations thereof, to provide an evener bar, as a unit, that is strong and rigid and of the length in excess of the over all width of the cultivator required by the four horse team.

I provide this normally-stiff long straight evener bar unit, that embodies sections 5, 6, with a suitable strengthening bracing truss arrangement. This truss, in the particular example shown, consists of opposite end struts 9, diagonal or inclined connecting members or braces 11, and truss rod 12 at its center bolted or otherwise secured to an abutment or center strut (not shown) rigid with the evener bar unit 5.

The two usually similar struts 9, extend rearwardly from the ends of the evener bar section 5, and at their front ends are fixed to section 5 in any suitable manner, as by the vertical clamping bolts 7.

Each stiff strut 9, can consist of a pair of strong longitudinally arranged metal bars spread vertically at their front portions to straddle section 5, and between their rear portions receiving the inclined truss or brace rods 11, and the center truss rod 12. The center truss rod 12 is arranged behind and longitudinally of the evener bar section 5, and extends between and at its ends is bolted or otherwise fixed to the rear end portion of struts 9.

The inclined braces or truss rods 11 are normally fixed to the rear portions of struts 9 and extend outwardly and forwardly therefrom and at their front outer ends are bolted or otherwise fixed to the evener bar extension sections 6, intermediate the lengths of said sections, usually to the outer end portions thereof.

The evener bar section 5, is, preferably, fixed to a supporting bracket or head that provides a rear abutment or strut fitting and secured to the center of the truss rod 12, said supporting bracket that carries section 5, having a front vertical hub or sleeve confined and rotatable on the supporting truck spindle 4, as disclosed by my mentioned Patent 1,279,677 for supporting and trussing the long one piece bar of said patent.

The evener bar unit 5, 6, is horizontally swingable as a unit on the center vertical axis 4 and the draft or pull of the draft animals on the evener bar end extensions is transmitted to the cultivator through said center pivot 4.

Figure 3:
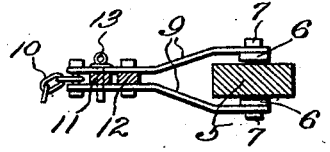
Fig. 3 is a detail section on the line 3—3, Fig. 1.
Figure 4:
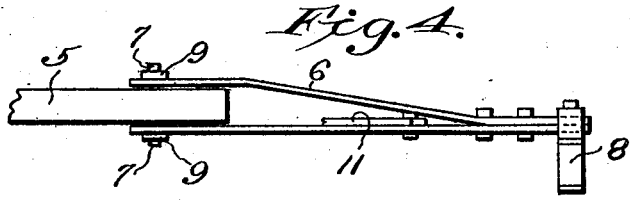
Fig. 4 is a detail front elevation of an end portion of the evener device.

To limit the horizontal swing of the evener bar unit 5, 6, with respect to the cultivator, suitable stop or stay connections are preferably provided between the ends of the evener bar section 5 and the adjacent portions of the cultivator frame. For instance, for this purpose, I show flexible stay or stop chains, or other connections 10, at their rear ends attached to the cultivator frame and at their front ends to the rear ends of the struts 9. These connections 10, normally hang slack or loose as indicated by Fig. 3.

It will be noted, that the bars 11, in effect, form forward and outward connections of the truss bar 12, so that the truss bar system 9, 11, 12, resists the strains and stresses set up by the forward pull of the draft animals on the outer or free ends of the evener bar end extension sections 6, and tends to maintain the stiffness of the evener bar unit 5, 6, and distribute the stresses in transmitting the draft on the cultivator through pivot or spindle 4.

It will be noted from Fig. 1, that the straight elongated rigid evener bar unit consisting of the operatively and rigidly connected sections 5, 6, 6, projects laterally beyond the path to be traveled by the cultivator, and in length exceeds the overall width of the cultivator, and hence will constitute an obstruction against the forward movement of the implement through passageways of a width to permit passage of the cultivator itself, and also materially increases the storage space required for the cultivator in the machine shed or the barn as well as on the dealer's display floor, and for shipping purposes.

To overcome this difficulty, I render the evener bar or device, as an entirety, foldable or collapsible, in length, either by hand when the team is not hitched thereto, or while maintaining the draft or pull connection between the end sections or extensions 6, and the center member 5, so that the draft animals can continue to advance the implement, as an entirety, even after the evener bar unit has been so reduced in length as to be shorter than the over-all width of the cultivator.

This result is accomplished, by collapsing the evener bar unit in length through forward swing or adjustment or by forwardly offsetting portions thereof while, if the team is attached, retaining such portions as draft receiving and transmitting parts of the unit.

For instance, the result can be accomplished by loosening the clamping bolts 7, and detaching the operative truss connections between evener bar end sections 6, and the struts 9 or the truss bar 12, and then swinging sections 6, forwardly (on bolts 7, as centers) to positions extending forwardly from the ends of the evener bar section 5, (see Fig. 2) and then again tightening the bolts 7, if need be. These adjustments can be made by hand when the draft animals are not attached, or if the draft animals are drawing the implement and the need arises, the adjustment can be made without detaching the draft animals from the end sections 6, and the pull of the draft animals can then be utilized to fold the sections 6 forwardly, and to then continue the forward movement of the implement, the draft passing to the center section 5, through ends 6, and bolts 7.

The truss connection can be rendered separable or detachable, by the provision of detachable coupling pins 13, between the inclined truss or brace bars 11, and the struts 9. The rear ends of the bars 11, preferably removably enter the spaces between the upper and lower bars of the struts 9, and are secured by vertical pins 13 extending through registering perforations in said struts and bars. These pins or bolts 13, are removable to permit separation of the parts and can be as readily reapplied to again secure the parts in normal positions.

Figure 2:
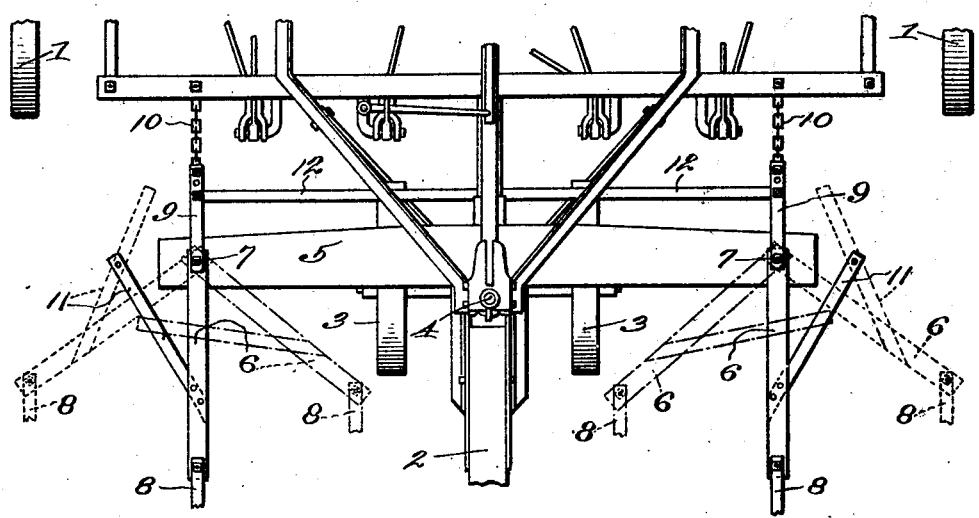
Fig. 2 is a top plan showing the evener device in folded or contracted form with its end sections swung forwardly, dotted and full lines showing some of the various angular positions to which said ends can be folded, portions of the implement being broken away.

It will also be noted that when the evener bar unit is reduced in length, Fig. 2, a truss system 9, 9, 12, is provided for the evener bar center section 5.

By lifting the pins 13 from operative coupling positions, the evener bar unit ends 6, can be folded forward any desired distances toward the tongue 2, some of which positions are indicated by dotted and full lines Fig. 2. The evener bar unit can be restored to its normal four horse team length for cultivating plants in rows, by swinging the ends back to normal positions (Fig. 1) and locking the ends in such positions by reapplication of pins 13 to operative coupling positions.

It is evident that various changes, variations and modifications might be resorted to without departing from the spirit and scope of my invention and hence I do not wish to limit the invention to the approximately precise disclosures hereof.

What I claim is:

1. A center pivoted evener bar unit for a straddle row agricultural implement comprising a center section having rearwardly extending end struts, a rear truss bar between and coupled to said struts, evener bar end extension sections at their outer ends formed for attachment of the draft animals and at their inner ends coupled to the outer ends of the center section, and rear detachable inclined truss bars between said extension sections and said struts.

2. An evener bar unit, for a straddle row agricultural implement, comprising a center section having extending struts at its outer ends, a bar connecting said struts, end extension bars at the outer ends of the center section, having suitable connections for draft animals, and movable to abnormal forwardly extending positions, and connection means between the extension bars and the rearwardly extending struts for securing said extension bars in the normal outwardly extending positions.

3. A straddle row agricultural implement, and a four-draft-animal evener bar unit embodying a center pivoted evener bar section transmitting the draft to the implement at its center pivot, and end extension bar sections at their outer ends having the sole hitch connections for said four draft animals and at their inner ends secured to the center section to transmit the draft of the animals thereto and to assume (1) normal rigid evener bar unit positions forming outward continuations of the center section and (2) abnormal positions folded forwardly from the center section, and means for normally holding said end sections in said normal positions.

4. An evener bar unit of the type substantially as described for a straddle row agricultural implement, embodying a central evener bar section formed intermediate its length for pivotal and draft pull connection with the implement, opposite end evener bar extension draft sections coupled to the central section to transmit the draft thereto and to move to abnormal positions extending forwardly therefrom and at their outer ends provided with the sole draft animal attachments of the unit, whereby the draft is applied to the central section through said extension sections whether in operative or in abnormal positions, and rear detachable truss connections applied to the outer portions of said end sections for normally securing said end sections in operative positions in rigid outward longitudinal extension of the central section.

5. A tillage implement having a front truck, in combination with a horizontally swingable center pivoted evener bar unit normally projecting beyond the implement ends, having draft transmitting central pivotal connection with said truck, said unit embodying a central section through which the draft is transmitted to the implement, opposite end extension sections at their inner ends coupled to the outer ends of the central section to transmit the draft thereto and at their outer ends provided with the sole draft animal attachments of the unit, truss means to normally maintain said end extensions in outward longitudinal continuation of the center section, said means being operable to permit said end extensions to move to abnormal forwardly projecting positions.

6. A straddle row tillage implement, and a horizontally swingable centrally-pivoted evener bar unit for four draft animals, said unit at its outer extremities having doubletrees coupled thereto for said draft animals and constituting the sole draft animal connection, said unit embodying a central main section, and opposite end extension sections normally in outward longitudinal continuation of the center section and at their inner ends coupled to the outer ends of the central section and at their outer ends having said doubletrees coupled thereto, means being provided normally maintaining said end extension sections in normal positions and whereby said end sections can be released to swing forwardly and carry said double trees forwardly and toward each other.

7. A horizontally-swingable center-pivoted evener bar unit for a straddle-row center-tongue front-truck tillage implement, said unit embodying a longitudinal center-section having a center draft and coupling connection for application to the implement, opposite end extension sections coupled to the outer ends of the center section to assume normal longitudinal and abnormal forwardly swung positions with respect thereto, and means establishing detachable truss connections to normally maintain said extension sections in operative longitudinal positions, the sole draft animal connections of the unit being provided at the outer ends of said extension sections, whereby the unit receives its draft solely through said extension sections and applies the draft to the implement through said center coupling connection.

Signed at Beatrice, in the county of Gage, and State of Nebraska, this 10th day of November, 1925.

WILLIAM ELLIOTT.